R. L. HARDIN.
WINDSHIELD.
APPLICATION FILED FEB. 16, 1918.
1,389,549.
Patented Aug. 30, 1921.
2 SHEETS—SHEET 1.
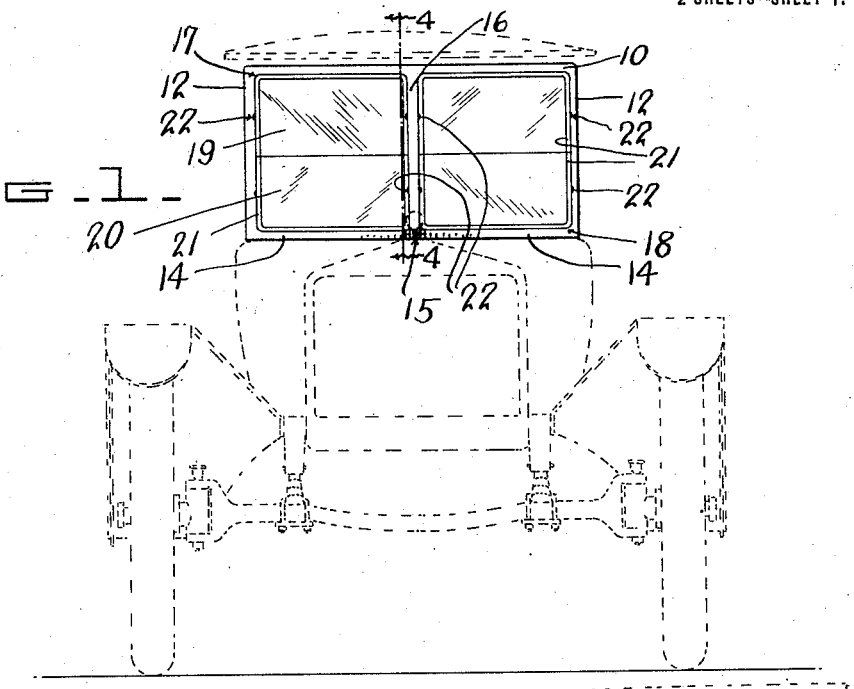
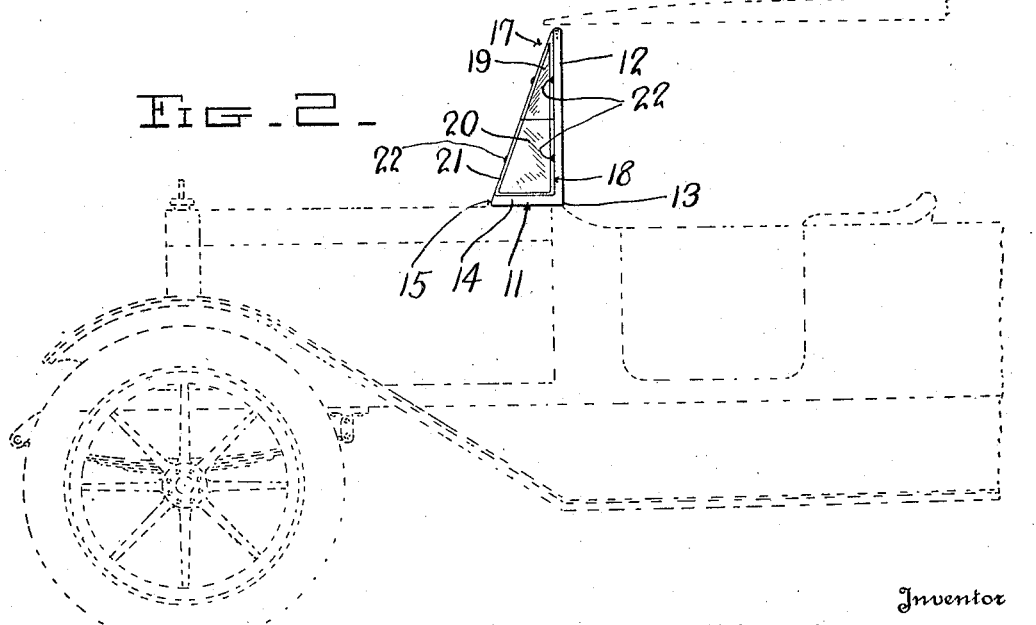
Inventor
R. L. Hardin
Witnesses
L. B. James
By Victor J. Evans
Attorney

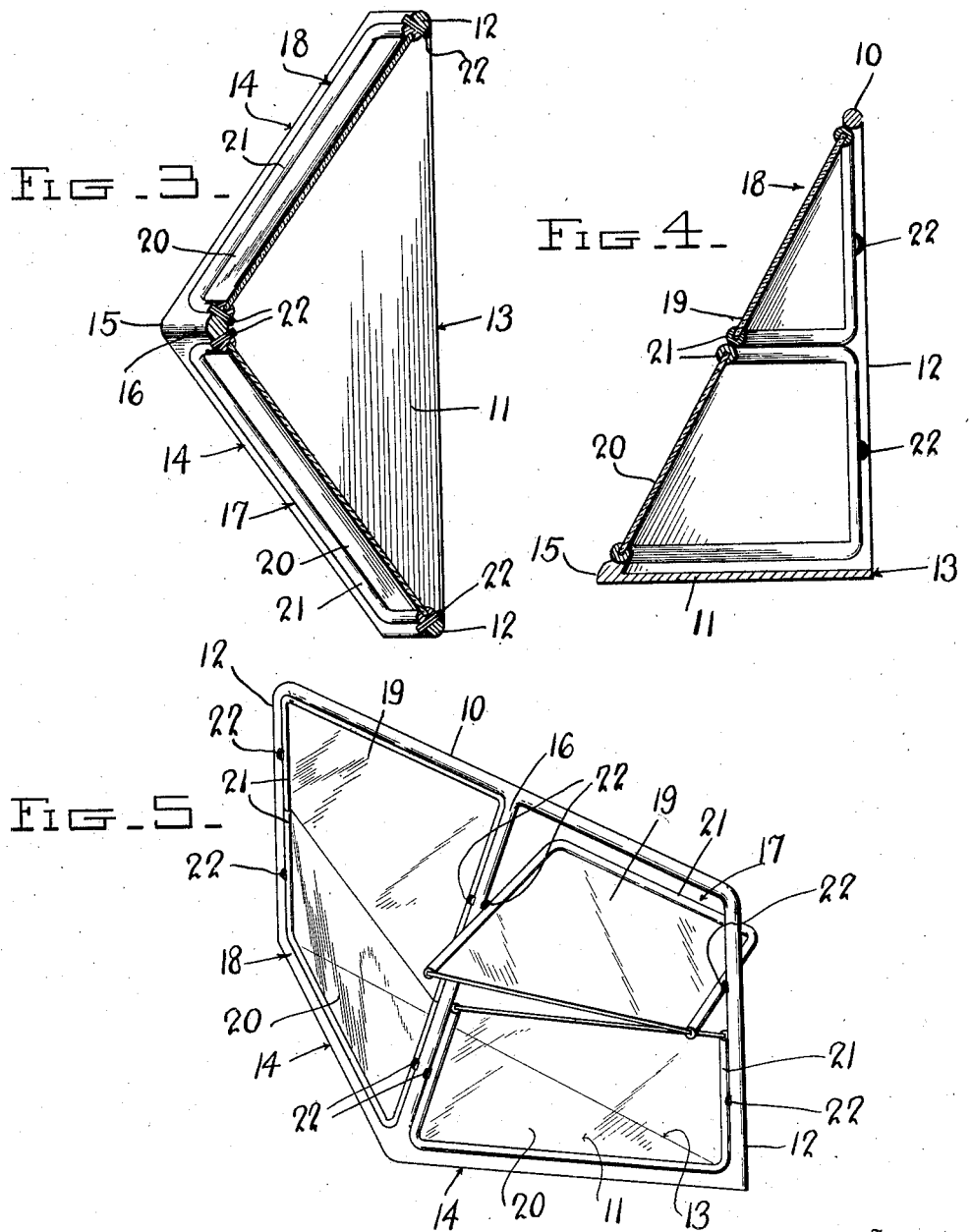

UNITED STATES PATENT OFFICE.

REYNO L. HARDIN, OF BLACKWELL, OKLAHOMA.

WINDSHIELD.

1,389,549.   Specification of Letters Patent.   Patented Aug. 30, 1921.

Application filed February 16, 1918. Serial No. 217,654.

*To all whom it may concern:*

Be it known that I, REYNO L. HARDIN, a citizen of the United States, residing at Blackwell, in the county of Kay and State of Oklahoma, have invented new and useful Improvements in Windshields, of which the following is a specification.

This invention relates to vehicle construction and has particular relation to wind shields for use in connection with motor vehicles.

The primary object of the invention is the provision of a wind shield constructed in a manner to offer the least possible resistance to the progress of the vehicle, the construction being such as to deflect the air upward and to each side of the vehicle.

A further object is the provision of a wind shield arranged in two sections, one of which is located upon each side of the longitudinal center of the vehicle, each section embodying independent upper and lower pivoted glass panels, permitting the occupant upon either side of the vehicle to adjust the shield to suit his convenience.

For the accomplishment of the above and other objects, the invention contemplates the provision of a frame adapted to be positioned transversely of the vehicle and including upper, lower and end bars and a central transversely disposed connecting bar, the latter dividing the frame into two sections, each of which contains upper and lower pivoted glass panels. The lower bar is of angular formation, projecting outwardly beyond the front face of the frame, while the central connecting bars extend from the upper bar outwardly and upwardly and connect with the forward angular extension of the lower bar.

In the drawings:

Figure 1 is a front elevation of a windshield constructed in accordance with the present invention and shown applied to a motor vehicle;

Fig. 2 is a side elevation of the same;

Fig. 3 is a horizontal sectional view;

Fig. 4 is a vertical section on the line 4—4 of Fig. 1; and

Fig. 5 is a detail perspective view of the windshield detached, showing the upper panels of one section slightly tilted.

Referring to the drawings in detail, like characters of reference denote corresponding parts.

In the preferred embodiment of the invention as illustrated, the shield comprises a substantially rectangular frame which inincludes an upper horizontal bar 10, a lower horizontal bar or base 11 and side bars 12. The lower bar or base 11 consists of a substantially flat member provided with an inner straight edge 13 preferably disposed in vertical alinement with the bars 10 and 12 and a forwardly extending angular edge providing oppositely inclined edges 14, the meeting point of which provides a forward extension 15. The upper and lower bars are connected by a central bar 16, which extends downwardly and forwardly from the upper bar 10 and connects with the forward extension 15 of the lower bar 11. This divides the frame into separate sections 17 and 18.

Each of the sections 17 and 18 contains upper and lower glass or other transparent panels 19 and 20, the said panels being surrounded upon three of their edges by frames 21. The frames 21 are pivotally mounted within the sections 17 and 18 as shown at 22, pivotal mounting being in the form of a ratchet or other analogous construction, which will hold the panels in their adjusted position. This enables the occupants upon either side of the vehicle to adjust the panels to suit their individual convenience. The angular relation of the upper and lower panels due to the inclination of the central connecting bar with respect to the end bars, permits of the opening of the upper panel in a manner to afford protection of the driver of the vehicle, the outer panel projecting beyond or overlapping the adjacent end of the lower panel when the former is tilted and preventing the entrance of rain or snow.

Various changes in the form, proportion and minor details of construction may be made without departing from the spirit and scope of the appended claim.

Having described the invention, what is claimed is:—

A windshield for vehicles, comprising a straight upper bar adapted to be located transversely of the front edge of the vehicle top, perpendicularly arranged parallel side bars depending from the upper bar, a lower bar provided with an angular bend at a point approximately central of its ends, said bend projecting forwardly of the bottom end of the side bars and a central connecting bar disposed transversely of the frame and extending from the upper bar to the straight apex of the angular bend of the lower bar, dividing the frame into separate sections an upper and lower transparent panel pivotally mounted in each section.

In testimony whereof I affix my signature.

REYNO L. HARDIN.